United States Patent [19]

Mutoh et al.

[11] Patent Number: 4,623,670

[45] Date of Patent: Nov. 18, 1986

[54] POROUS FLUORINE RESIN MEMBRANE AND PROCESS FOR PREPARING THE SAME

[75] Inventors: Yoshihiko Mutoh, Fujisawa; Morikazu Miura, Yokohama, both of Japan

[73] Assignee: Asahi Kasei Kogyo Kabushiki Kaisha, Osaka, Japan

[21] Appl. No.: 808,491

[22] Filed: Dec. 13, 1985

[30] Foreign Application Priority Data

Dec. 27, 1984 [JP] Japan .............................. 59-273920
Apr. 9, 1985 [JP] Japan ................................ 60-73471

[51] Int. Cl.$^4$ .............................................. C08J 9/26
[52] U.S. Cl. .................................. 521/61; 210/500.36; 521/64; 521/134; 521/145
[58] Field of Search .................. 521/61, 64, 145, 134; 210/500.2

[56] References Cited

U.S. PATENT DOCUMENTS 2,915,483 12/1959 Barnhart ............................ 521/145
3,379,658 4/1968 Kemper ............................ 521/61
3,536,796 10/1970 Rock ..................................... 521/61
4,181,983 1/1980 Kulkami ............................ 521/61

*Primary Examiner*—Morton Foelak
*Attorney, Agent, or Firm*—Birch, Stewart, Kolasch & Birch

[57] ABSTRACT

The invention relates to a porous membrane made of a particular fluorine resin, having excellent chemical resistance, excellent thermal resistance, excellent filtration performance and excellent mechanical properties, and having uniform porous structure comprising minute pores, and also relates to a process for preparing the same. In particular, the invention relates to a porous membrane suited for a microfilter having excellent thermal resistance and excellent filtration performance, especially a porous membrane suited for a microfilter for use in purification of chemicals such as strong acid and strong alkali by utilizing the excellent chemical resistance, and also a process for preparing the same.

11 Claims, No Drawings

POROUS FLUORINE RESIN MEMBRANE AND PROCESS FOR PREPARING THE SAME

BACKGROUND OF THE INVENTION

This invention relates to a porous fluorine resin membrane and a process for preparing the same.

As porous fluorine type resin membrane having excellent chemical resistance and thermal resistance, there have been known the following ones. Japanese Unexamined Patent Publications Nos. 136354/1975, 158465/1979 and 147030/1984 are known to disclose porous membranes made of an ethylene-tetrafluoroethylene copolymer and processes for preparing the same. The Japanese Unexamined Patent Publication No. 136354/1975 discloses a process in which fine powder of an ethylene-tetrafluoroethylene copolymer is subjected to styrene polymerization by preparing a mixed solution of a styrene monomer and a slurry to form a membrane, from which a styrene polymer is eluted to form a porous membrane. The porous membrane obtained by this process, however, has a pore size of as large as $10\mu$ and, moreover, has very poor permeability, thereby being unsuitable for a microfilter. The Japanese Unexamined Patent Publication No. 158465/1979 discloses a process in which a film of an ethylene-tetrafluoroethylene copolymer is subjected to charging particle irradiation, followed by etching with an aqueous solution of sodium hydroxide to form a porous membrane. However, the porous membrane thus obtained, having no three dimensional network structure, is not only poor in its performance but also inferior in the mechanical properties, thereby making it impossible to obtain a uniform, hollow fibrous porous membrane. Moreover, there is a problem that the process is not suited for a mass production since it uses a nuclear reactor. The Japanese Unexamined Patent Publication No. 147030/1984 discloses a process in which a film of an ethylene-tetrafluoroethylene copolymer is coated with a resist to form a resist pattern having holes, and thereafter a thru-hole corresponding to the resist pattern is formed by sputter etching treatment to obtain a porous membrane. The porous membrane obtained by this process, however, which also has no three dimensional network structure, is also not only poor in its performance but also inferior in the mechanical properties, thereby making it difficult to obtain a uniform, hollow fibrous porous membrane. Moreover, there is a problem in the productivity since the process requires the sputter etching over a long period of time.

As a process having solved the above problems, Japanese Unexamined Patent Publications Nos. 79011/1980 159128/1981, 28139/1982, 93798/1983, 179297/1983, etc. are known to disclose a process in which an ethylene-tetrafluoroethylene copolymer, fine powder of silica and dioctylphthalate are mixed and melt-molded, followed by extraction of the fine powder of silica and dioctylphthalate from the molded product to form a porous membrane. However, the porous membrane obtained by this process has not sufficient uniformity in the pore structure, and contains a number of voids which are extraordinarily large as compared with its mean pore size. Accordingly, although this porous membrane is a membrane having a three dimensional network structure, the number of fibers constituting the network is small in the thicknesswise direction of the membrane, and the performance to eliminate fine particles is inferior when it is used as a microfilter. Moreover, this porous membrane generates pinholes (abnormal coarse communicated holes) very frequently, and has a problem of inconsistency in the quality (great variance in performance) of the membrane and inferiority in the productivity (yield of an article of good quality).

Thus, as mentioned above, none of the conventionally available porous membranes made of an ethylene-tetrafluoroethylene copolymer and processes for preparing the same have been satisfactory.

As a porous membrane made of polychlorotrifluoroethylene, there is a diaphragm membrane for use in electrolysis as disclosed in Japanese Unexamined Patent Publications Nos. 34081/1972 and 25065/1973. However, these membranes, which are used as diaphragm membranes for electrolysis, have extremely low permeability, and are not suited for a porous membrane for use in a microfilter. Accordingly, none of the conventionally available porous membranes made of polychlorotrifluoroethylene and processes for preparing the same have been satisfactory.

Further, nothing has been known conventionally as to membranes comprising an ethylene-chlorotrifluoroethylene copolymer and processes for preparing the same.

SUMMARY OF THE INVENTION

This invention relates to a porous membrane having excellent chemical resistance, thermal resistance and mechanical properties, having a uniform porous structure comprising minute pores, and having excellent permeability. An object of this invention is to provide a porous membrane which makes it possible to carry out highly precise filtration purification such as thermal conc. sulfuric acid filtration where severe conditions for the thermal resistance and chemical resistance are imposed. Another object of this invention is to provide a process for preparing such a porous membrane in good productivity.

This invention is principally characterized by a porous fluorine resin membrane comprising a fluorine resin selected from the group consisting of an ethylene-tetrafluoroethylene copolymer, an ethylene-chlorotrifluoroethylene copolymer and polychlorotrifluoroethylene, having a mean pore size of from 0.01 to $5\mu$ and a porosity of 40 to 90%, and having a three dimensional network structure such that the symbol N designating the number of fibers constituting a network is $N \geq 2p/D$ per 1 mm in the thicknesswise direction of the membrane, wherein p represents porosity (%) and D represents mean pore size ($\mu$). It is also characterized by a process for preparing a porous fluorine resin membrane, which comprises mixing 10 to 60% by volume of a fluorine resin selected from the above-mentioned group, 7 to 42% by volume of an inorganic fine powder material and 30 to 75% by volume of a chlorotrifluoroethylene oligomer, followed by melt-molding to form a molded product, removing by extraction the chlorotrifluoroethylene oligomer from said molded product, and further removing by extraction therefrom the inorganic fine powder material. It is further characterized by a process for preparing a porous fluorine resin membrane, which comprises mixing 10 to 60% by volume of a fluorine resin selected from the above-mentioned group, 7 to 42% by volume of an inorganic fine powder material and 30 to 75% by volume of a mixture of a chlorotrifluoroethylene oligomer and an organic heat-resistant substance having the SP value of 5 to 11 other than the chlorotrifluoroethylene oligomer, followed by melt-molding to form a molded product, removing by extraction the chlorotrifluoroethylene oligomer and the organic heat-resistant substance from said molded product, and further removing by extraction therefrom the inorganic fine powder material.

DETAILED DESCRIPTION OF THE INVENTION

In this invention, an ethylene-tetrafluoroethylene copolymer, an ethylene-chlorotrifluoroethylene copolymer and polychlorotrifluoroethylene which are excellent in the chemical resistance, thermal resistance and mechanical resistance are selected as the material for the porous membrane. A mixture of these resins may also be used.

The ethylene-tetrafluoroethylene copolymer is a copolymer wherein ethylene and tetrafluoroethylene principally are combined alternately. Its melting point varies depending on the compositional proportion of ethylene to tetrafluoroethylene and it ranges from about 200° C. to about 280° C. One having a higher melting point is more preferred. If the copolymer is substantially an ethylene-tetrafluoroethylene copolymer, it is permissible to use a copolymer thereof with a third component such as hexafluoropropylene or a copolymer wherein a stabilizing agent or the like for preventing deterioration of the polymer is incorporated. Commercially available products include Aflon COP (trademark, produced by Asahi Garasu K.K.), Nefolon ETFE (trademark, produced by Daikin Kogyo K.K.), Tefzel (trademark, produced by Du Pont), Hostaflon (trademark, produced by Hoechst), etc.

The ethylene-chlorotrifluoroethylene copolymer is a copolymer wherein ethylene and chlorotrifluoroethylene principally are combined alternately. Its melting point varies depending on the compositional proportion of ethylene to chlorotrifluoroethylene and it ranges from about 200° C. to about 260° C. One having a higher melting point is more preferred. If the copolymer is substantially an ethylene-chlorotrifluoroethylene copolymer, it is permissible to use a copolymer thereof with a third component or a copolymer wherein a stabilizing agent or the like for preventing deterioration of the polymer is incorporated. Commercially available products include Halar (trademark, produced by Allied Corp.), etc.

The polychlorotrifluoroethylene is a polymer of chlorotrifluoroethylene. Its melting point ranges from 210° C. to 220° C. If it is substantially polychlorotrifluoroethylene, it is permissible to use a copolymer with a second component or a polymer wherein a stabilizing agent or the like for preventing deterioration of the polymer is incorporated. Commercially available products include Daiflon (trademark, produced by Daikin Kogyo K.K.), Aclon CTFE (trademark, produced by Allied Corp.), Kel-F (trademark, produced by 3M ), Voltalef (trademark, produced by Ugine Kuhlmann), etc.

In the porous membrane according to this invention, the mean pore size ranges preferably from 0.01 to 5$\mu$, more preferably from 0.05 to 1$\mu$. If it is less than 0.01$\mu$, the permeability becomes too low, and if it exceeds 5$\mu$, the performance to eliminate fine particles becomes inferior, both of which cases are thus undesirable. The porosity preferably ranges from 40 to 90%. If it is less than 40%, the permeability becomes too low, and if it exceeds 90%, the mechanical properties are seriously worsened, both of which cases are thus undesirable.

The porous membrane according to this invention has a three dimensional network structure. The three dimensional network structure herein refers to a porous structure in which the network structure constituted of resin is observed on the surface and at every section of the porous membrane, namely the so-called spongy structure in which pores constituting the porous structure are continuously communicated with each other in the interior of the membrane. Such a three dimensional network structure gives excellence in the strength as a porous membrane, and, when the porous membrane is used for a filter, it also gives excellence in the particle-rejection property to eliminate impurity particles such as dust by the same effect as in the case where screens are overlapped in a large number.

Further, the fiber constituting the network structure herein refers to a netlike resin portion surrounding a pore. Although it is termed as "fiber" for convenience sake, no particular limitation is given to its shape, and, other than the fibrous structure, the shape may be of laminated structure, knotted structure or amorphous structure if the three dimensional network structure can be formed.

It is required in this invention that the symbol N designating the number of fibers constituting a network is $N \geq 2p/D$ per 1 mm, preferably $N \geq 5p/D$ per 1 mm, in the thicknesswise direction of the membrane, wherein p represents porosity (%) and D represents mean pore size ($\mu$). If $N < 2p/D$, the membrane becomes inferior undesirably in the particle rejection effect to eliminate impurity particles such as dust when it is used as a filter.

Membrane thickness of the porous membrane of the invention preferably ranges from 0.025 to 2.5 mm. If it is less than 0.025, the mechanical properties become inferior, and if it exceeds 2.5 mm, the permeability becomes inferior, both of which cases are thus undesirable. The membrane may take the shape of a hollow fiber, a tube, a flat membrane, etc., but, in view of its use for a microfilter, it is preferably in the shape of a hollow fiber for the reason of compactness of a device in which the membrane is assembled into a module.

Features of the process for preparing the porous membrane according to this invention will be described below.

In this invention, there may be used a fluorine resin comprising an ethylene-tetrafluoroethylene copolymer, an ethylene-chlorotrifluoroethylene copolymer or polychlorotrifluoroethylene, an inorganic fine powder material, and a chlorotrifluoroethylene oligomer or a mixture of a chlorotrifluoroethylene oligomer and a heat-resistant substance having the SP value of 5 to 11 other than the chlorotrifluoroethylene oligomer.

The inorganic fine powder material preferably comprises fine particles having a specific surface area of 50 to 500 $m^2/g$ and a mean particle size being in the range of from 0.005 to 0.5$\mu$. Useful inorganic fine powder material includes silica, calcium silicate, aluminum silicate, magnesium oxide, alumina, calcium carbonate, kaolin, clay, diatomaceous earth, etc. Of these, fine powder of silica is preferred in particular.

In the process according to the invention, it is essential to use the chlorotrifluoroethylene oligomer, and it has been made possible for the first time by using it to prepare a porous membrane having uniform pore structure and excellent particle-rejection property to remove impurity particles such as dust, with constant quality of membrane and with good productivity. The chlorotrifluoroethylene oligomer is preferably a tetramer to twentymer (4 to 20 mers), more preferably an octamer to pentadecamer (8 to 15 mers), most preferably a nonamer to dodecamer (9 to 12 mers) of chlorotrifluoroethylene. If it is a trimer (3 mers) or less, the thermal resistance becomes poor to cause enormous evaporation at the time of melt-molding, and the permeability of the porous membrane becomes smaller undesirably. Also, if it is 21 mers or more, the mixing workability is worsened and the extractability is also worsened undesirably. The mer number of the chlorotrifluoroethylene oligomer used in this invention may refer to an average mer number when it is a chlorotrifluoroethylene oligomer constituted of a mixture of chlorotrifluoroethylene oligomer having various mer numbers.

In this invention, it becomes easy to control the pore size of the porous membrane by using a mixture of chlorotrifluoroethylene oligomer and a heat-resistant organic substance having the solubility parameter (hereinafter "SP value") of 5 to 11 other than the chlorotrifluoroethylene oligomer. Namely, it becomes possible to readily control the pore size to a desired pore size by making selection of the heat-resistant organic substance and/or regulation of the mixing proportion of the chlorotrifluoroethylene oligomer to the heat-resistant organic substance. In particular, in a process for preparing porous membranes of polychlorotrifluoroethylene, it is preferable to use the mixture of chlorotrifluoroethylene oligomer and the other heat-resistant organic substance since the pore size may become small to lower the permeability when the chlorotrifluoroethylene oligomer is used alone.

Mixing ratio of the chlorotrifluoroethylene oligomer to the other heat-resistant organic substance may vary depending on the kind of the heat-resistant organic substance, but, in general, it is preferably 10 volumes or less, preferably 4 volumes or less, based on the chlorotrifluoroethylene oligomer. If it exceeds 10 volumes, the pore size of a membrane obtained tends to become large, and the membrane is liable to have a non-uniform structure and also tends to frequently generate pinholes (abnormal coarse communicated holes). When the heat-resistant organic substance is silicone oil, the above mixing ratio is preferably 2 volumes or less.

If a mixture of a chlorotrifluoroethylene oligomer and a heat-resistant organic substance having the SP value exceeding 11 is used, the pore size of the membrane obtained becomes undesirably too large for the membrane to have uniform pore structure since the compatibility of the chlorotrifluoroethylene oligomer with the heat-resistant organic substance having the SP value exceeding 11 is poor. (A heat-resistant organic substance having the SP value of less than 5 has not been available in the art.)

The heat-resistant organic substance in this invention is an organic substance which has the thermal resistance such that the boiling point at 1 atm. is at least 200° C. or more, preferably 250° C. or more, and in the form of a liquid at the time of melt-molding of the porous membrane of the invention. The heat-resistant organic substance having the SP value of 5 to 11 may include silicon oil, a perfluoropolyether oligomer, a phthalic acid ester, a trimellitic acid ester, sebacic acid ester, an adipic acid ester, an azelaic acid ester, a phosphoric acid ester, etc. Of these, preferred are silicone oil, a perfluoropolyether oligomer and a trimellitic acid ester. In particular, silicone oil is more preferred in view of its stability at the time of melt-molding, cost, etc. Silicone oil is a heat-resistant organic substance having a siloxane structure and includes dimethyl silicone, methylphenyl silicone, diphenyl silicone, etc.

The mixing ratio of a chlorotrifluoroethylene oligomer with a heat-resistant organic substance having a SP value of 5 to 11 except for chlorotriethylene oligomer may differ depending on the kind of the heat-resistant organic substance, but may generally be preferred to be 10 volumes of a heat-resistant organic substance per one volume of the chlorotrifluoroethylene oligomer, more preferably 4 volumes or less. If it exceeds 10 volumes, the membrane obtained tends to have a greater pore size and also a nonuniform pore structure, and pinholes (abnormal coarse connected pores) also tend to occur frequently. When the heat-resistant organic substance is silicone oil, it should preferably be employed in 2 volumes or less.

In preparing the porous membrane of this invention, prepared first is a mixture of a fluorine resin comprising an ethylene-tetrafluoroethylene copolymer, an ethylene-chlorotrifluoroethylene copolymer or polychlorotrifluoroethylene, an inorganic fine powder material and a chlorotrifluoroethylene oligomer or a mixture thereof with a heat-resistant organic substance having the SP value of 5 to 11 other than the chlorotrifluoroethylene oligomer. The mixing proportion is 10 to 60% by volume, preferably 15 to 40% by volume of the fluorine resin; 7 to 42% by volume, preferably 10 to 20% by volume of the inorganic fine powder material; and 30 to 75% by volume, preferably 50 to 70% by volume of the chlorotrifluoroethylene oligomer or the mixture thereof with the heat-resistant organic substance. If the fluorine resin is present in less than 10% by volume, the resin amount is so small that the strength may become small and also the moldability may become poor. If it is in excess of 60% by volume, a porous membrane having a large porosity is not obtained undesirably. If the inorganic fine powder material is present in less than 7% by volume, the molding becomes difficult to carry out, and if it is in excess of 42% by volume, the fluidity at the melting step becomes poor to obtain only a molded product which is too brittle to be put into a practical use. If the chlorotrifluoroethylene oligomer or the mixture thereof with the heat-resistant organic substance is present in less than 30% by volume, the porosity of a porous membrane obtained becomes lower than 40% with the result that no porous membrane having excellent permeability can be obtained, and if it is in excess of 75% by volume, the molding becomes so difficult to carry out that no porous membrane having high mechanical strength can be obtained.

Mixing of the above respective components is carried out by means of a mixing machine such as a Henschel mixer, a V-blender and a ribbon blender. As for the order of mixing, it is preferable to first mix the inorganic fine powder material and the chlorotrifluoroethylene oligomer or the mixture thereof with the heat-resistant organic substance and then incorporating the fluorine resin for mixing, rather than mixing the respective components simultaneously. This mixture is preferably further kneaded by means of a melting and kneading device such as an extruder. The kneaded product thus obtained is crushed with a crusher if desired and then melt-molded into a flat membrane or a hollow fiber membrane by means of an extruder. It is also possible to directly mold the mixture by means of a device having both kneading and extruding functions, such as a kneader-extruder Next, the chlorotrifluoroethylene oligomer or the mixture thereof with the heat-resistant organic substance used in combination is extracted from the membranous molded product with use of a solvent. When the mixture of the chlorotrifluoroethylene oligomer with the heat-resistant organic substance substance is used, both of the two components are preferably extracted simultaneously, but alternatively may be extracted separately for each component. The extraction may be carried out according to an ordinary method for extraction, employed for a membranous product, such as a batch method and a countercurrent multistage method. The solvent used for the extraction may preferably include a halogenated hydrocarbon such as 1,1,1-trichloroethane and tetrachloroethylene.

After finishing the extraction of the trifluoroethylene oligomer or the mixture thereof with the heat-resistant organic substance, a half-extracted porous membrane is further subjected to extraction of the inorganic fine powder material with use of a solvent for inorganic fine powder material. Extraction is carried out according to an ordinary method for extraction such as a batch method and a countercurrent multistage method, and is finished in several seconds to several tens of hours. The solvent used for the inorganic fine powder material includes an acid such as hydrochloric acid, sulfuric acid and hydrofluoric acid for extraction of calcium carbonate, magnesium carbonate, magnesium oxide, calcium silicate, magnesium carbonate, etc. and an aqueous alkali solution such as sodium hydroxide and potassium hydroxide for extraction of silica. Other solvents may be used without any particular limitation if they do not substantially dissolve the fluorine resin, but dissolve the inorganic fine powder material.

When it is desired to obtain a porous membrane having higher thermal resistance, it is effective to carry out an annealing treatment after extraction of the chlorotrifluoroethylene oligomer, etc. and in a state where the inorganic fine powder material is present in the membrane, and then remove by extraction the inorganic fine powder material.

In general, when a porous membrane is exposed to high temperature in order to be assembled into a module or when a filtration under a high temperature condition is carried out, it often occurs that the pore size of the porous membrane is varied and the permeability is lowered.

The present inventors have considered that the lowering of performance of a porous membrane at a high temperature is principally caused by a mechanism that, when a porous membrane is processed for molding, a "distortion" is generated in the interior of the resin constituting the porous membrane and a cancellation of the "distortion" occurs at heating, and they have made intensive studies on a process by which the "distortion" is suppressed to a minimum extent to prepare a porous membrane affording less lowering of performance at a high temperature. In general, an annealing is carried out in order to cancel such "distortion". When the annealing is carried out in a conventional manner on a porous membrane constituted of a resin only, the properties are greatly changed, and yet non-uniformly changed at every portion of the membrane. As a result of change in the shape of the membrane, the resultant membrane is of non-uniformity and tends to be one which can not achieve reproducibility. In order not to cause such a non-uniform change in the physical properties, the membrane may be restrained by some means so as not to cause the change in the shape of the membrane, but in general it is difficult to restrain a membrane externally. Even if it is a flat membrane, it is difficult to restrain the membrane in the thicknesswise direction, although possible in the longitudinal and lateral directions. In a hollow fibrous porous membrane, it is much more difficult to restrain the membrane in the direction other than the longitudinal direction, and it is also difficult to obtain a uniform membrane by applying an annealing.

The present inventors have found that a porous membrane in a state being filled with an inorganic fine powder material may be subjected to an annealing in a hot-air oven or the like, whereby the inorganic fine powder material itself restrains internally the shape of a porous membrane, and as a result a uniform membrane can be obtained with good reproducibility. Temperature for the annealing may be a temperature higher than the glass transition point of the resin, but it is preferably in the range of from the melting point of the resin to $-100°$ C. from the viewpoint of the productivity or the time required for the annealing. It is more effective and desirable to conduct the treatment at a temperature higher than the actual temperature to be expected (including the heated conditions at the step of assembling a module). Time for annealing treatment, although being correlated with the treatment temperature, may be usually in the range of from several seconds to several days.

When the improvement in the thermal resistance of a porous membrane by the annealing is insufficient, another annealing may be carried out again after the first annealing was applied and the inorganic fine powder material was removed by extraction, whereby the thermal resistance of a porous membrane may be further improved.

In this invention, in order to enlarge the pore size, increase the porosity or improve the mechanical properties of a porous membrane, the porous membrane from which one or both of the chlorotrifluoroethylene oligomer or the mixture thereof with the heat-resistant organic substance used in combination, and the inorganic fine powder material has been extracted may be drawn monoaxially or biaxially.

The properties indicated in this invention are determined in accordance with the following measurement methods.

Mean pore size ($\mu$):

Pore sizes are measured by an electron-microscopic observation on the surfaces and the sections of a specimen, and then averaged (number average).

Porosity (%):

Determined by the following equation:

$$\text{Porosity (\%)} = \frac{\text{Void volume}}{\text{Porous material volume}} \times 100$$

wherein the void volume is obtained by subtracting the weight of a porous material only, from the weight of a porous material filled with water in the pores of the porous material.

Three dimensional network structure:

Visually judged by a microscopic observation using a scanning type electron microscope.

The number N of fibers constituting the network (number/mm):

A membrane is sectionally observed by an electron microscope to count the number of fibers in the thicknesswise direction of the membrane and calculated as the number of fibers per 1 mm length of the membrane. When there is irregularity in the porous structure, the number is measured at several portions and then averaged. SP value (solubility parameter):

Calculated by the following equation (Small's equation):

$$SP \text{ value} = D \cdot \Sigma \, G/M$$

wherein D: specific gravity, G: molar attraction constant* and M: molecular weight.
* Disclosed, for instance, in P. A. Small, J. Appl. Chem., 3, February, 1953, p. 75

Indices relating to the practical performance of a membrane may include the following.

Frequency of generation of pinholes (number/m):
The number of pores extraordinarily coarse is evaluated. This is an evaluation item for the uniformity in the porous structure. A continuously hollow fibrous porous membrane of 150 m is immersed in ethyl alcohol and a pressure which is 0.5 kg/cm² lower than the bubble point pressure (measured according to the ASTM F316-80) of the porous membrane is applied on the interior of one side of the hollow fiber, and the number of bubbles generated under such situation is checked to calculate the frequency according to the following equation:

$$\text{Frequency of generation of pinholes (number/m)} = \frac{\text{Number of bubbles generated}}{150}$$

Particle rejection (%):
This is a factor relating to the performance to eliminate fine particles which are rejected from passing, i.e. eliminated, by a porous membrane when filtration is performed. An aqueous solution in which Uniform Latex Particles available from Dow Chemical Co. are diluted to have the solid concentration of 0.01% by weight is filtered through a porous membrane, and the concentration of Latex Particles in the solution having passed the membrane is evaluated to determine the proportion of elimination of the Latex Particles.

Water permeation quantity (lit/m², hr atm. 25° C.):
This is a factor relating to the quantity of water passing through a porous membrane when filtration is performed, and is measured at 25° C. and pressure difference of 1 kg/cm².

The porous fluorine resin type membrane according to this invention assumes uniform porous structure, and has excellent permeability, chemical resistance, thermal resistance and durability, capable of achieving highly precise filtration purification. Also, the preparation process according to this invention can produce the porous membrane with high efficiency.

The present invention will be further illustrated by but is not intended to be limited to the following examples wherein parts and percentages are by volume.

EXAMPLE 1

11.1% by volume of fine powder of silica (Aerosil R-972, trademark, produced by Japan Aerosil Co.; specific surface area: 120 m²/g; mean particle size: 16 μm) and 62.2% by volume of a chlorotrifluoroethylene oligomer (Daifloil #20, trademark, produced by Daikin Kogyo K.K., about 8 mers) were mixed by use of a Henschel mixer, to which further added was 26.7% by volume of an ethylene - tetrafluoroethylene copolymer (Aflon COP Z-8820, trademark, produced by Asahi Garasu K.K.), and mixing was carried out again by use of a Henschel mixer.

The mixture obtained was kneaded in a twin extruder of 30 mm φ at 260° C. and formed into pellets. The pellets were molded at 260° C. into hollow fibers by means of a hollow fiber preparation apparatus comprising a twin extruder of 30 mm φ equipped with a hollow spinneret. The molded hollow fiber was immersed in 1,1,1-trichloroethane at 50° C. for 1 hour to extract the chlorotrifluoroethylene oligomer, followed by drying.

Subsequently, the product obtained as above was immersed in a 40% aqueous solution of sodium hydroxide at 70° C. for 1 hour to extract the fine powder of silica, followed by water-washing and drying.

The porous membrane thus obtained, made of an ethylene-tetrafluoroethylene copolymer, had a three dimensional network structure. Performances thereof are shown in Table 1.

EXAMPLES 2 TO 4

A porous membrane of an ethylene-tetrafluoroethylene copolymer was obtained in the same manner as in Example 1 except that the chlorotrifluoroethylene oligomer was replaced by a mixture comprising dimethyl silicone (Shin-etsu Silicone KF 96, trademark, produced by Shin-etsu Kagaku Kogyo K.K., SP value: 6.3) in the volume shown below based on 1 part by volume of a chlorotrifluoroethylene oligomer (Daifloil #20, trademark, produced by Daikin Kogyo K.K.; about 8 mers).

| (Volume of dimethyl silicone) | |
|---|---|
| Example 2 | 0.17 part by volume |
| Example 3 | 0.20 part by volume |
| Example 4 | 0.25 part by volume |

The porous membrane obtained each had a three dimensional structure. Performances thereof are shown in Table 1.

EXAMPLE 5

13.3% by volume of fine powder of silica (Aerosil R-972, trademark, produced by Japan Aerosil Co.) and 60.0% by volume of a chlorotrifluoroethylene oligomer (Daifloil #100, trademark, produced by Daikin Kogyo K.K.; about 11 mers) were mixed by use of a Henschel mixer, to which was added was 26.7% by volume of an ethylene-tetrafluoroethylene copolymer (Aflon COP Z-8820, trademark, produced by Asahi Garasu K.K), and mixing was carried out again by use of a Henschel mixer.

Subsequently, a porous membrane of a ethylene-tetrafluoroethylene copolymer was obtained in the same manner as in Example 1.

The porous membrane obtained had a three dimensional network structure with the performances as shown in Table 1.

EXAMPLE 6

In Example 5, annealing treatment was applied at 200° C. for 1 hour in a hot-air circulation type heating chamber after the chlorotrifluoroethylene oligomer was extracted and the resultant material was dried. Thereafter, the material thus treated was immersed in a 40% aqueous solution of sodium hydroxide at 70° C. for 1 hour to extract the fine powder of silica, followed by water-washing and drying.

The porous membrane thus obtained, made of an ethylene-tetrafluoroethylene copolymer, had a three dimensional network structure. The performances thereof are shown in Table 1.

As a standard evaluation of the thermal resistance to examine the usability of a membrane at high temperature, the membrane obtained here was allowed to stand for 4 hours in an atmosphere of 180° C. to evaluate its physical properties. The rate of change relative to the original properties was as small as follows: water permeation quantity, a decrease of 7%; porosity, a decrease of 3%; mean pore size, a decrease of 0%.

For comparison, the membrane obtained in Example 5 having been applied with no annealing was also allowed to stand for 4 hours in an atmosphere of 180° C. to evaluate its physical properties. As a result, the rate of change relative to the original properties was as large as follows: water permeation quantity, a decrease of 47%; porosity, a decrease of 13%; mean pore size, a decrease of 10%.

It is seen from the comparison between Examples 5 and 6 and also from the foregoing facts, that the thermal resistance of a membrane can be improved without serious changes in the properties of the membrane by making the annealing treatment on a porous membrane which is in a state of being filled with the inorganic fine powder material.

EXAMPLE 7

14.4% by volume of fine powder of silica (Aerosil R-972, trademark, produced by Japan Aerosil Co.) and 58.9% by volume of a chlorotrifluoroethylene oligomer (Daifloil #100, trademark, produced by Daikin Kogyo K.K.) were mixed by use of a Henschel mixer, to which was added 26.7 % by volume of an ethylene-tetrafluoroethylene copolymer (Neoflon ETFE EP-540, trademark, produced by Daikin Kogyo K.K.), and mixing was carried out again by use of a Henschel mixer.

The mixture obtained was kneaded in a twin extruder of 30 mm $\phi$ at 260° C. and formed into pellets. The pellets were molded at 250° C. into a hollow fiber by means of a hollow fiber preparation apparatus comprising a twin extruder of 30 mm $\phi$ equipped with a hollow spinneret. The molded hollow fiber was immersed in 1,1,1-trichloroethane at 50° C. for 1 hour to extract the chlorotrifluoroethylene oligomer, followed by drying.

Thereafter, an annealing was applied at 200° C. for 1 hour in a hot-air circulation type heating chamber. Subsequently, the material thus treated was immersed in a 40% aqueous solution of sodium hydroxide at 70° C. for 1 hour to extract the fine powder of silica, followed by water-washing and drying.

The porous membrane obtained, made of an ethylene-tetrafluoroethylene copolymer, had a three dimensional network structure. The performances thereof are shown in Table 1.

EXAMPLE 8

The porous membrane of an ethylene-tetrafluoroethylene copolymer obtained in Example 7 was again applied with an annealing at 200° C. for 2 hours.

The porous membrane obtained had a three dimensional network structure with the performances as shown in Table 1.

This membrane was allowed to stand for 2 hours at 200° C. in a hot-air circulation type heating chamber to evaluate its physical properties. As a result, the rate of change relative to the original properties was found to be as small as follows: water permeation quantity, a decrease of 4%; porosity, a decrease of 0%; mean pore size, a decrease of 0%.

For comparison, the membrane obtained in Example 7 having been applied with no re-annealing was similarly allowed to stand for 2 hours in an atmosphere of 200° C. to evaluate its physical properties. As a result, the rate of change relative to the original properties was found to be as large as follows: water permeation quantity, a decrease of 24%; porosity, a decrease of 4%; mean pore size, a decrease of 5%.

It is seen from the foregoing that the re-annealing of a porous membrane is effective for improvement in the thermal resistance of the membrane.

EXAMPLES 9 TO 11

Porous membranes of an ethylene-tetrafluoroethylene copolymer are obtained in the same manner as in Example 1 except that the fine powder of silica, (Aerosil R-972, trademark, produced by Japan Aerosil Co.), chlorotrifluoroethylene oligomer (Daifloil 100, trademark, produced by Daikin Kogyo K.K.) and ethylene-tetrafluoroethylene copolymer (Neoflon ETFE EP-540, trademark, produced by Daikin Kogyo K.K.) are used in the following composition.

| | Composition (% by volume) | | |
|---|---|---|---|
| | Fine powder of silica | Chlorotrifluoro-ethylene oligomer | Ethylene-tetrafluoro-ethylene copolymer |
| Example 9 | 7 | 35 | 58 |
| Example 10 | 13 | 72 | 15 |
| Example 11 | 21 | 63 | 16 |

The porous membrane obtained each have a three dimensional network structure with the performances as shown in Table 1.

COMPARATIVE EXAMPLE 1

As a process for preparing a porous membrane of an ethylene-tetrafluoroethylene copolymer, tested was a process already known as disclosed in Japanese Unexamined Patent Publication No. 79011/1980 (U.S. Pat. No. 4,229,297), namely, a process in which dioctylphthalate is used in place of the chlorotrifluoroethylene oligomer in this invention.

13.3% by volume of fine powder of silica (Aerosil 200, trademark, produced by Japan Aerosil Co.; specific surface area: 200 m$^2$/g; mean particle size: 16 m$\mu$) and 60.0% by volume of dioctylphthalate was mixed by use of a Henschel mixer, to which was added 26.7% by volume of an ethylene-tetrafluoroethylene copolymer (Aflon COP Z-8820, trademark, produced by Asahi Garasu K.K), and mixing was carried out again by use of a Henschel mixer.

The mixture obtained was kneaded in a twin extruder of 30 mm $\phi$ at 300° C. and formed into pellets. The pellets were molded at 290° C. into a hollow fiber by means of a hollow fiber preparation apparatus comprising a twin extruder of 30 mm $\phi$ equipped with a hollow spinneret.

The molded hollow fiber was immersed in 1,1,1-trichloroethane at 50° C. for 1 hour to extract dioctylphthalate, followed by drying.

Subsequently, the product treated as above was immersed in a 40% aqueous solution of sodium hydroxide at 70° C. for 1 hour to extract the fine powder of silica followed by water-washing and drying.

The performances of the porous membrane thus obtained are shown in Table 1.

The porous membrane obtained here was a nonuniform membrane in which a large number of large voids was present. As a result of measurement of 0.085μ fine particle rejection, it was as small as 95%, which was inferior to the membrane of the invention in Example 4 in which the rejection was 100%. Further, the preparation of the porous membrane was repeated five times under the same conditions, with the results that the porous membrane obtained had a mean pore size, of 0.3 to 0.8μ, water permeation quantity of 650 to 3000 lit/m².hr.atm. 25° C. to show that the membrane performances were seriously changed and the quality of membrane was not constant.

Example 14 ... 58.9% by volume of a chlorotrifluoroethylene oligomer (Daifloil #100, trademark, produced by Daikin Kogyo K.K.; about 11 mers)

Example 15 ... a mixture of 44.2% by volume of a chlorotrifluoroethylene oligomer (Daifloil #20, trademark, produced by Daikin Kogyo K.K.) and 14.7% by volume of dimethyl silicone (Shin-etsu Silicone KF 96, trademark, produced by Shin-etsu Kagaku Kogyo K.K.)

Example 16 ... a mixture of 29.5% by volume of a chlorotrifluoroethylene oligomer (Daifloil #20, trademark, produced by Daikin Kogyo K.K.) and 29.4 % by volume of dimethyl silicone (Shin-etsu Silicone KF 96, trademark, produced by Shin-etsu Kagaku Kogyo K.K.)

The mixture obtained was kneaded in a twin extruder of 30 mm φ at 250° C. and formed into pellets. The pellets were molded at 230° into a hollow fiber by means of a hollow fiber preparation apparatus compris-

TABLE 1

| | Hollow fiber diameter (mm) outer diameter | Hollow fiber diameter (mm) inner diameter | Mean membrane thickness (μ) | Mean pore size D (μ) | Porosity P (%) | Number of fibers N (number/mm) | α in $N = \alpha \cdot \frac{P}{D}$ | Water permeation quantity (lit/m² · hr · atm · 25° C.) | Pinhole generation frequency (number/m) |
|---|---|---|---|---|---|---|---|---|---|
| Example 1 | 1.04 | 0.52 | 260 | 0.05 | 60 | 7000 | 5.8 | 150 | 0 |
| Example 2 | 1.00 | 0.50 | 250 | 0.21 | 65 | 2100 | 6.8 | 1100 | 0 |
| Example 3 | 1.02 | 0.52 | 250 | 0.42 | 67 | 1200 | 7.5 | 1500 | 0 |
| Example 4 | 1.00 | 0.50 | 250 | 0.65 | 67 | 790 | 7.7 | 2400 | 0 |
| Example 5 | 1.04 | 0.52 | 260 | 0.22 | 67 | 2100 | 6.9 | 1600 | 0 |
| Example 6 | 1.00 | 0.48 | 260 | 0.20 | 68 | 2100 | 6.2 | 1700 | 0 |
| Example 7 | 1.24 | 0.77 | 235 | 0.21 | 67 | 2200 | 6.9 | 1700 | 0 |
| Example 8 | 1.17 | 0.73 | 220 | 0.20 | 65 | 2200 | 6.8 | 1300 | 0 |
| Example 9 | 1.02 | 0.52 | 250 | 0.29 | 40 | 990 | 7.2 | 550 | 0 |
| Example 10 | 1.00 | 0.50 | 250 | 0.42 | 81 | 1400 | 7.4 | 2000 | 0 |
| Example 11 | 1.02 | 0.52 | 250 | 0.19 | 82 | 2600 | 6.0 | 1900 | 0 |
| Comparative Example 1 | 1.00 | 0.50 | 250 | 0.61 | 68 | 200 | 1.8 | 2300 | 0.4 |

EXAMPLES 12 TO 16

14.4% by volume of fine powder of silica (Aerosil R-972, trademark, produced by Japan Aerosil Co.) and the compound shown below were mixed by use of a Henschel mixer, to which was added 26.7% by volume of an ethylene-chlorotrifluoroethylene copolymer (Halar 920, trademark, produced by Allied Corp.), and mixing was carried out again by use of a Henschel mixer.

Example 12 ... 58.9% by volume of a chlorotrifluoroethylene oligomer (Daifloil #20, trademark, produced by Daikin Kogyo K.K.; about 8 mers)

Example 13 ... 58.9% by volume of a chlorotrifluoroethylene oligomer (Daifloil #50, trademark, produced by Daikin Kogyo K.K.; about 9 mers)

ing a twin extruder of 30 mm φ equipped with a hollow spinneret. The molded hollow fiber was immersed in 1,1,1-trichloroethane at 50° C. for 1 hour to extract the chlorotrifluoroethylene oligomer and the dimethyl silicone, followed by drying. Subsequently, the product thus treated was immersed in a 40% aqueous solution of sodium hydroxide at 70° C. for 1 hour to extract the fine powder silica, followed by water-washing and drying.

The porous membranes obtained, made of an ethylene-chlorotrifluoroethylene copolymer, each had a three dimensional network structure with the performances as shown in Table 2.

TABLE 2

| | Hollow fiber diameter (mm) outer diameter | Hollow fiber diameter (mm) inner diameter | Mean membrane thickness (μ) | Mean pore size D (μ) | Porosity P (%) | Number of fibers N (number/mm) | α in $N = \alpha \cdot \frac{P}{D}$ | Water permeation quantity (lit/m² · hr · atm · 25° C.) | Pinhole generation frequency (number/m) |
|---|---|---|---|---|---|---|---|---|---|
| Example 12 | 1.25 | 0.66 | 290 | 0.08 | 56 | 4200 | 6.0 | 220 | 0 |
| Example 13 | 1.24 | 0.68 | 280 | 0.12 | 61 | 3200 | 6.3 | 420 | 0 |
| Example 14 | 1.26 | 0.66 | 300 | 0.18 | 65 | 2300 | 6.5 | 920 | 0 |
| Example 15 | 1.28 | 0.62 | 330 | 0.32 | 59 | 1300 | 6.8 | 870 | 0 |
| Example 16 | 1.28 | 0.58 | 350 | 2.1 | 58 | 200 | 7.2 | 28000 | — |

EXAMPLES 17 TO 20

13.3% by volume of fine powder of silica (Aerosil R-972, trademark, produced by Japan Aerosil Co.) and the compound shown below were mixed by use of a Henschel mixer, to which was added 26.7% by volume of polychlorotrifluoroethylene (Daiflon M-300, trademark, produced by Daikin Kogyo K.K.), and mixing was carried out again by use of a Henschel mixer.

Example 17 . . . 60.0% by volume of a chlorotrifluoroethylene oligomer (Daifloil #20, trademark, produced by Daikin Kogyo K.K.)

Example 18 . . . a mixture of 30.0% by volume of a chlorotrifluoroethylene oligomer (Daifloil #20, trademark, produced by Daikin Kogyo K.K.) and 30.0% by volume of dimethyl silicone (Shin-etsu Silicone KF 96, trademark, produced by Shin-etsu Kagaku Kogyo K.K.)

Example 19 . . . a mixture of 30.0% by volume of a chlorotrifluoroethylene oligomer (Daifloil #20, trademark, produced by Daikin Kogyo K.K.) and 30.0% by volume of tri-(2-ethylhexyl)trimellitate (SP value: 9.0)

Example 20 . . . a mixture of 15.0% by volume of a chlorotrifluoroethylene oligomer (Daifloil #20, trademark, produced by Daikin Kogyo K.K.) and 45.0% by volume of tri-(2-ethylhexyl)trimellitate The mixture obtained was kneaded in a twin extruder of 30 mm $\phi$ at 250° C. and formed into pellets. The pellets were molded at 250° C. into a hollow fiber by means of a hollow fiber preparation apparatus comprising a twin extruder of 30 mm $\phi$ equipped with a hollow spinneret. The molded hollow fiber was immersed in 1,1,1-trichloroethane of 50° C. for 1 hour to extract the chlorotrifluoroethylene oligomer, dimethyl silicone and tri-(2-ethylhexyl)trimellitate, followed by drying. Subsequently, the product thus treated was immersed in a 40% aqueous solution of sodium hydroxide at 70° C. for 1 hour to extract the fine powder of silica, followed by water-washing and drying.

The porous membranes obtained, made of polychlorotrifluoroethylene, each had a three dimensional network structure. The performances thereof are shown in Table 3.

EXAMPLE 21

11.1% by volume of fine powder of silica (Aerosil R-972, trademark, produced by Japan Aerosil Co.), 46.7% by volume of a chlorotrifluoroethylene oligomer (Daifloil #20, trademark, produced by Daikin Kogyo K.K.) and 15.6% by volume of dimethyl silicone (Shin-etsu Silicone KF 96, trademark, produced by Shin-etsu Kagaku Kogyo K.K.) were mixed by use of a Henschel mixer, to which was added 26.6% by volume of polychlorotrifluoroethylene (Daifloil M-300, trademark, produced by Daikin Kogyo K.K.), and mixing was carried out again by use of a Henschel mixer.

Subsequent procedures were followed in the same manner as in Example 18 to obtain a porous membrane of polychlorotrifluoroethylene having the three dimensional network structure. The performances thereof are shown in Table 3.

EXAMPLE 22

In Example 21, an annealing was applied at 200° C. for 1 hour in a hot-air circulation type heating chamber after the chlorotrifluoroethylene oligomer and dimethyl silicone were extracted, and the resultant material was dried. Thereafter, the material thus treated was immersed in a 40% aqueous solution of sodium hydroxide at 70° C. for 1 hour to extract the fine powder of silica, followed by water-washing and drying.

The porous membrane obtained, made of polychlorotrifluoroethylene, had a three dimensional network structure with the performances as shown in Table 3.

The membrane obtained here was allowed to stand for 1 hour at 180° C. in a hot-air circulation type heating chamber to evaluate its physical properties. As a result, the rate of change relative to the original properties was found to be as small as follows: water permeation quantity, a decrease of 21%; porosity, a decrease of 9%; mean pore size, a decrease of 9%.

For comparison, the membrane obtained in Example 21 having been applied with no annealing was also allowed to stand for 1 hour in an atmosphere of 180° C. to evaluate its physical properties. As a result, the rate of change relative to the original properties was as large as follows: water permeation quantity, a decrease of 75%; porosity, a decrease of 38%; mean pore size, a decrease of 17%.

EXAMPLES 23 TO 25

Porous membranes of polychlorotrifluoroethylene are obtained in the same manner as in Example 18, except that the fine powder of silica (Aerosil R-972, trademark, produced by Japan Aerosil Co.), chlorotrifluoroethylene oligomer (Daifloil #20, trademark, produced by Daikin Kogyo K.K.), dimethyl silicone (Shin-etsu Silicone KF96, trademark, produced by Shin-etsu Kagaku Kogyo K.K.) and polychlorotrifluoroethylene (Daiflon M-300, trademark, produced by Daikin Kogyo K.K.) are used to have the following composition.

| | Composition (% by volume) | | | |
|---|---|---|---|---|
| | Fine powder of silica | Chlorotrifluoroethylene oligomer | Dimethyl silicone | Polychlorotrifluoroethylene |
| Example 23 | 7 | 18 | 17 | 58 |
| Example 24 | 13 | 36 | 36 | 15 |
| Example 25 | 21 | 32 | 31 | 16 |

The porous membrane obtained, made of polychlorotrifluoroethylene, had a three dimensional network structure with the performances as shown in Table 3.

TABLE 3

| | Hollow fiber diameter (mm) | | Mean membrane thickness ($\mu$) | Mean pore size D ($\mu$) | Porosity P (%) | Number of fibers N (number/mm) | $\alpha$ in $N = \alpha \cdot \frac{P}{D}$ | Water permeation quantity (lit/m$^2$ · hr · atm · 25° C.) | Pinhole generation frequency (number/m) |
|---|---|---|---|---|---|---|---|---|---|
| | outer diameter | inner diameter | | | | | | | |
| Example 17 | 2.01 | 1.02 | 500 | 0.01 | 45 | 25000 | 5.5 | 15 | — |
| Example 18 | 2.42 | 1.50 | 460 | 0.25 | 73 | 2000 | 7.0 | 1200 | 0 |
| Example 19 | 2.50 | 1.51 | 500 | 0.22 | 75 | 2300 | 6.8 | 950 | 0 |
| Example 20 | 2.51 | 1.52 | 500 | 0.45 | 75 | 1200 | 7.4 | 2500 | 0 |
| Example 21 | 1.02 | 0.52 | 250 | 0.18 | 52 | 1900 | 6.5 | 570 | 0 |
| Example 22 | 1.00 | 0.48 | 260 | 0.22 | 55 | 1700 | 6.7 | 1090 | 0 |
| Example 23 | 2.41 | 1.49 | 460 | 0.31 | 41 | 950 | 7.2 | 620 | 0 |

TABLE 3-continued

| | Hollow fiber diameter (mm) outer diameter | Hollow fiber diameter (mm) inner diameter | Mean membrane thickness ($\mu$) | Mean pore size D ($\mu$) | Porosity P (%) | Number of fibers N (number/mm) | $\alpha$ in $N = \alpha \cdot \frac{P}{D}$ | Water permeation quantity (lit/m$^2$ · hr · atm · 25° C.) | Pinhole generation frequency (number/m) |
|---|---|---|---|---|---|---|---|---|---|
| Example 24 | 2.40 | 1.50 | 450 | 0.43 | 82 | 1400 | 7.3 | 2600 | 0 |
| Example 25 | 2.39 | 1.49 | 450 | 0.22 | 83 | 2600 | 6.8 | 1200 | 0 |

What is claimed is:

1. A process for preparing a porous fluorine resin membrane, which comprises mixing 10 to 60% by volume of a fluorine resin selected from the group consisting of an ethylene-tetrafluoroethylene copolymer, an ethylene-chlorotrifluoroethylene copolymer and polychlorotrifluoroethylene, 7 to 42% by volume of an inorganic fine powder material and 30 to 75% by volume of a chlorotrifluoroethylene oligomer, followed by melt-molding to form a molded product, removing by extraction the chlorotrifluoroethylene oligomer from said molded product, and further removing by extraction therefrom the inorganic fine powder material.

2. A process for preparing a porous fluorine resin membrane, which comprises mixing 10 to 60% by volume of a fluorine resin selected from the group consisting of an ethylene-tetrafluoroethylene copolymer, an ethylene-chlorotrifluoroethylene copolymer and polychlorotrifluoroethylene, 7 to 42% by volume of an inorganic fine powder material and 30 to 75% by volume of a mixture of a chlorotrifluoroethylene oligomer and an organic heat-resistant substance having the SP value of 5 to 11 other than the chlorotrifluoroethylene oligomer, followed by melt-molding to form a molded product, removing by extraction the chlorotrifluoroethylene oligomer and the organic heat resistant substance from said molded product, and further removing by extraction therefrom the inorganic fine powder material.

3. A process for preparing a porous fluorine resin membrane, which comprises mixing 10 to 60% by volume of a fluorine resin selected from the group consisting of an ethylene-tetrafluoroethylene copolymer, an ethylene-chlorotrifluoroethylene copolymer and polychlorotrifluoroethylene, 7 to 42% by volume of an inorganic fine powder material and 30 to 75% by volume of a chlorotrifluoroethylene oligomer, followed by melt-molding to form a molded product, applying an annealing after removing by extraction the chlorotrifluoroethylene oligomer from said molded product, and further removing by extraction therefrom the inorganic fine powder material.

4. A process for preparing a porous fluorine resin membrane, which comprises mixing 10 to 60% by volume of a fluorine resin selected from the group consisting of an ethylene-tetrafluoroethylene copolymer, an ethylene-chlorotrifluoroethylene copolymer and polychlorotri-fluoroethylene, 7 to 42% by volume of an inorganic fine powder material and 30 to 75% by volume of a mixture of a chlorotrifluoroethylene oligomer and an organic heat-resistant substance having the SP value of 5 to 11 other than the chlorotrifluoroethylene oligomer, followed by melt-molding to form a molded product, applying an annealing after removing by extraction the chlorotrifluoroethylene oligomer and the organic heat resistant substance from said molded product, and further removing by extraction therefrom the inorganic fine powder material.

5. The process for preparing a porous fluorine resin membrane according to claim 2, wherein said heat-resistant organic substance is silicone oil.

6. The process for preparing a porous fluorine resin membrane according to claim 1, wherein said chlorotrifluoroethylene oligomer is a 4 to 20 mer.

7. The process for preparing a porous fluorine resin membrane according to claim 4, wherein said heat-resistant organic substance is silicone oil.

8. The process for preparing a porous fluorine resin membrane according to claim 2, wherein said chlorotrifluoroethylene oligomer is a 4 to 20 mer.

9. The process for preparing a porous fluorine resin membrane according to claim 3, wherein said chlorotrifluoroethylene oligomer is a 4 to 20 mer.

10. The process for preparing a porous fluorine resin membrane according to claim 4, wherein said chlorotrifluoroethylene oligomer is a 4 to 20 mer.

11. The process for preparing a porous fluorine resin membrane according to claim 5, wherein said chlorotrifluoroethylene oligomer is a 4 to 20 mer.

* * * * *